United States Patent
Crane et al.

(10) Patent No.: US 12,492,631 B2
(45) Date of Patent: Dec. 9, 2025

(54) DOWNHOLE ELECTROMAGNETIC INDUCTION COMMUNICATION DEVICE

(71) Applicant: Leading Magnetic Design Ltd, Swansea (GB)

(72) Inventors: Alex Crane, Swansea (GB); Yuri Zhuravlev, Swansea (GB)

(73) Assignee: Leading Magnetic Design Ltd., Swansea (GB)

( * ) Notice: Subject to any disclaimer, the term of this patent is extended or adjusted under 35 U.S.C. 154(b) by 125 days.

(21) Appl. No.: 18/496,103

(22) Filed: Oct. 27, 2023

(65) Prior Publication Data
US 2024/0141778 A1    May 2, 2024

(30) Foreign Application Priority Data
Oct. 28, 2022    (GB) ...................................... 2216010

(51) Int. Cl.
*E21B 47/13* (2012.01)
*E21B 47/12* (2012.01)
(52) U.S. Cl.
CPC .................................... *E21B 47/13* (2020.05)
(58) Field of Classification Search
None
See application file for complete search history.

(56) References Cited

U.S. PATENT DOCUMENTS 3,555,409 A * 1/1971 Atwood .................... G01V 3/28
324/340
3,758,847 A * 9/1973 Dowling .................. G01V 3/28
324/340
7,212,173 B2 * 5/2007 Chen ......................... G01V 3/28
343/895
2015/0008928 A1 * 1/2015 Miles ...................... E21B 15/00
324/339
2022/0011350 A1 * 1/2022 Di .............................. G01R 1/18

FOREIGN PATENT DOCUMENTS

RU    2290508 C1    12/2006

OTHER PUBLICATIONS

UK Intellectual Patent Office, Search Report for GB2216010.5 dated Mar. 29, 2023—1 page.

* cited by examiner

*Primary Examiner* — Curtis A Kuntz
*Assistant Examiner* — Jerold B Murphy
(74) *Attorney, Agent, or Firm* — Heslin Rothenberg Farley & Mesiti P.C.

(57) ABSTRACT

There is described a downhole electromagnetic induction communication system with a receiver arranged to receive from a transmitter a magnetic signal. The downhole electromagnetic induction communication system receiver comprising: a first inductive coil, a second inductive coil, and an amplifier; wherein the first inductive coil and the second inductive coil are configured to convert the magnetic signal into a first input electrical signal and a second input electrical signal. Additionally, the first inductive coil and the second inductive coil are differentially connected to inputs of the amplifier, such that a differential input electrical signal is found, the differential input electrical signal comprising reduced noise compared with the first input electrical signal and the second input electrical signal. The downhole electromagnetic induction communication system reduces noise and improves a signal-to-noise ratio of communications.

13 Claims, 4 Drawing Sheets

DOWNHOLE ELECTROMAGNETIC INDUCTION COMMUNICATION DEVICE

CROSS-REFERENCE TO RELATED APPLICATION

This application claims priority to United Kingdom Application No. 2216010.5. filed Oct. 28, 2022, and entitled "Downhole Electromagnetic Induction Communication Device," which is incorporated by reference herein in its entirety.

FIELD OF THE INVENTION

The present invention relates to an electromagnetic induction communication system for use in downhole drilling environments.

BACKGROUND OF THE INVENTION

There is a need for medium to short range, 2-200 m, wireless data communication between downhole tools in oil and gas deep drilling applications. Use of cables can be complicated by borehole specific requirements, such as dimensions constraints, and harsh environmental conditions such as high temperature, high pressure, high vibration and shock, and abrasive drilling fluid flow.

Attempts at electromagnetic induction communication have been hampered by inherent magnetic noise problems due to magnetic sensor vibration, caused by drilling, within a magnetic field of Earth.

Existing solutions require physical contact with ground rock that has widely varying conductivity, and hence may be unable to operate in highly resistive formations like anhydrite or dolomite. In addition, requirements for physical contact may reduce a mechanical strength of downhole tools.

In addition, existing solutions compensate for noise induced by vibration in a magnetic field of Earth using analogue and digital filtering. This filtering is ineffective because vibration induced magnetic noise may be present at a same frequency as a modulated telemetry signal. As such, this filtering does not adequately improve a signal-to-noise ratio of communication.

As such, there is a need for an electromagnetic induction communication system which reduces noise and improves a signal-to-noise ratio of communications.

Objects and aspects of the present claimed invention seek to alleviate at least these problems with the prior art.

SUMMARY OF THE INVENTION

At its most general, the present invention provides a downhole electromagnetic induction communication system receiver comprising a first inductive coil, a second inductive coil, and an amplifier wherein the first inductive coil and the second inductive coil are differentially connected to inputs of the amplifier.

By connecting the first inductive coil and the second inductive coil to the amplifier in a differential manner, a noise in a resulting amplified signal is reduced compared with noise in signals from each of the first inductive coil and the second inductive coil directly.

The reduced noise may enable the downhole electromagnetic induction communication system receiver to provide communication to a host system that is clearer, more accurate, and/or received from a greater distance. The reduced noise may enable a message in the signal to be more easily detectable, in other words, to stand out. This may enable a more accurate receipt of the message and reduce a number of errors in the message. In turn, this may enable more complex messages to be sent and accurately received, improving a quality of communication along a borehole. The reduced noise may enable the downhole electromagnetic induction communication system receiver to detect a signal from a background noise level at a greater distance. This may enable the signals transmitted from a greater distance to be detected and messages in the signals to be received from a greater distance. This may increase an effective range of the downhole electromagnetic induction communication system receiver which, in turn, may allow the downhole electromagnetic induction communication system receiver to be arranged at a greater distance from a source of the signals, such as a transmitter. Further, increasing a range of the downhole electromagnetic induction communication system receiver may enable signals and messages to be received from a deeper level in a downhole drilling environment. Furthermore, increasing a range of the downhole electromagnetic induction communication system receiver may enable signals and messages to be received from a greater distance, thereby increasing a range of industrial applications for which the system is suitable.

According to a first aspect of the invention, there is provided a downhole electromagnetic induction communication system receiver arranged to receive from a transmitter a magnetic signal, the receiver comprising: a first inductive coil, a second inductive coil, and an amplifier; wherein the first inductive coil and the second inductive coil are configured to convert the magnetic signal into a first input electrical signal and a second input electrical signal; and wherein the first inductive coil and the second inductive coil are differentially connected to inputs of the amplifier, such that a differential input electrical signal is found, the differential input electrical signal comprising reduced noise compared with the first input electrical signal and the second input electrical signal.

The downhole electromagnetic induction communication system receiver is arranged to receive from a transmitter a magnetic signal, and provide a corresponding electrical signal to a host system. The magnetic signal may be a modulated magnetic signal. The electrical signals may be modulated electrical signals.

The receiver may be probe shaped, that is to say, the receiver is essentially cylindrical and has a length which is many times greater than a diameter of the receiver. In use, the receiver is configured to be disposed inside downhole tubing. The downhole tubing may be formed of a metallic material, and is preferably formed of a non-magnetic metallic material.

A transmitter is also arranged, in use, inside downhole tubing. A separation distance between the transmitter and the receiver may be between 2 m and 10 m, and optionally may be up to 200 m. In some cases, the transmitter and receiver may be arranged inside the downhole tubing such that a longitudinal axis of the transmitter is parallel with a longitudinal axis of the receiver. In some cases, the longitudinal axis of the transmitter and the longitudinal axis of the receiver may be collinear. In other cases, the longitudinal axis of the transmitter may not be parallel to the longitudinal axis of the receiver. In this way, of the longitudinal axis of one of the transmitter and receiver may intersect an extension of the longitudinal axis of the other one of the transmitter and receiver.

The downhole electromagnetic induction communication system receiver comprises a first inductive coil, a second inductive coil. Each of the first inductive coil and second inductive coil comprises magnet wire. The first inductive coil and second inductive coil may each comprise a plurality of turns of magnet wire. The first inductive coil and the second inductive coil are each configured as magnetic sensors. The first inductive coil and a second inductive coil may each comprise a solenoid. When in the presence of a magnetic field, a first current may flow through the first inductive coil that is proportional to the strength of the magnetic field at the first inductive coil. In the same way, when in the presence of a magnetic field, a second current may flow through the second inductive coil that is proportional to the strength of the magnetic field at the second inductive coil.

In a uniform magnetic field, a current induced in the first inductive coil may be substantially identical to a current induced in the second inductive coil. In other words, in a uniform magnetic field, an amplitude of an alternating current induced in the first inductive coil may be substantially identical to an amplitude of an alternating current induced in the second inductive coil. Hence, a response of the first inductive coil and a response of the second inductive coil to a uniform magnetic field are substantially identical. In this way, the first current that may flow through the first inductive coil when in the presence of a uniform magnetic field may be substantially identical to the second current that may flow through the second inductive coil when in the presence of the uniform magnetic field. The identical nature of the response of the first inductive coil and the second inductive coil, i.e. the identical nature of the first current and the second current may be exploited to detect non-uniformity in a magnetic field. Further, the first current and the second current may be used to measure, or otherwise provide an indication of a parameter of, a non-uniform magnetic field.

To achieve a substantially identical behaviour from the first inductive coil and the second inductive coil, the first inductive coil and the second inductive coil may be substantially identical. That is to say, the first inductive coil and the second inductive coil may be formed from the same magnet wire, that is, magnet wire with at least the same diameter, or gauge, material properties and coating.

The first inductive coil and the second inductive coil may be wound in a same one of a clockwise or anticlockwise direction. The first inductive coil and second inductive coil may each comprise a substantially identical number of turns of magnet wire. The first inductive coil and second inductive coil may beare dimensionally identical. The first inductive coil and second inductive coil may have a same nominal diameter and a same axial length. Within manufacturing tolerances, the first inductive coil and second inductive coil may be substantially identical.

Alternatively, the first inductive coil and the second inductive coil may not be substantially identical. The first inductive coil and the second inductive coil may formed from different magnet wire, a different number of turns of magnet wire, and/or have differing lengths and diameters. The second inductive coil may be wound in an opposite direction from the first inductive coil. For example the first inductive coil may be wound in a clockwise direction, and the second coil may be wound in an anticlockwise direction. The first inductive coil and the second inductive coil may have a substantially identical behaviour without being themselves substantially identical. In this case, the first inductive coil and the second inductive coil may be selected to exhibit matching behaviour.

Longitudinal axes of each of the first inductive coil and the second inductive coil may be collinear. The first inductive coil and second inductive coil may be separated by a distance along their collinear axes. The distance between the first inductive coil and second inductive coil may be between 0.5 m and 1.5 m. The first inductive coil and second inductive coil are disposed within the receiver such that a longitudinal axis of the receiver and longitudinal axes of each of the first inductive coil and the second inductive coil are parallel. In some cases, the longitudinal axis of the receiver and the longitudinal axes of each of the first inductive coil and the second inductive coil may be collinear. In this case, first inductive coil and second inductive coil may be separated by a distance along the axis of the receiver. The distance between the first inductive coil and second inductive coil may be between 0.5 m and 1.5 m along the axis of the receiver. As discussed above, a longitudinal axis of a transmitter may be parallel, or even collinear with, a longitudinal axis of the receiver. As such, there exists a case in which the longitudinal axes of the transmitter, receiver, first inductive coil and second conductive coil are all parallel, or even collinear.

According to this arrangement, a first distance, measured between the transmitter and the first inductive coil, may be different to a second distance, measured between the transmitter and the second inductive coil. In the case of collinearity between the longitudinal axes of the transmitter, receiver, first inductive coil and second inductive coil, the difference between the first distance and the second distance may be the same as the distance between the first inductive coil and the second inductive coil. In other cases, the difference between the first distance and the second distance may be a function of the distance between the first inductive coil and the second inductive coil. The arrangement of transmitter, first inductive coil and second inductive coil must satisfy the requirement that the first distance and the second distance are not substantially identical.

In operation, the transmitter transmits a non-uniform magnetic field. A strength of this field decays rapidly with distance from the transmitter. Where a length of the transmitter is much smaller than a distance between the transmitter and the receiver, a magnetic signal strength of the transmitter may be estimated using Equation 1. According to Equation 1, where $B_X$ is a magnetic field strength along a longitudinal axis of the transmitter, M is a magnetic moment of the transmitter, and R is a distance from the transmitter, magnetic field strength, $B_X$, is proportional to the reciprocal of a cube of the distance from the transmitter, R.

$$Bs = \frac{M}{4\pi R^3} \quad (1)$$

At a given location, the strength of the magnetic field of the transmitter is inversely proportional to a cube of a distance of the given location from the transmitter. Hence, a difference between the first distance and the second distance will yield a difference in the magnetic field strength at the first inductive coil compared with at the second inductive coil. In particular, a one of the first inductive coil and the second inductive coil which is arranged at a lesser distance from the transmitter may experience a stronger magnetic field, and a one of the first inductive coil and the second inductive coil which is arranged at a greater distance from the transmitter may experience a weaker magnetic field. Hence, a disparity may exist between a response of the first inductive coil to the magnetic field and a response of the second inductive coil to the magnetic field. In other words, in the presence of the non-uniform magnetic field transmitted by the transmitter, the first current may be different from the second current. In particular, a one of the first inductive coil and the second inductive coil which is arranged at a lesser distance from the transmitter may experience a stronger magnetic field and produce a greater current and a one of the first inductive coil and the second inductive coil which is arranged at a greater distance from the transmitter may experience a weaker magnetic field and produce a lesser current.

In contrast, a magnetic field generated by mechanical vibration of magnetic components within a magnetic field of Earth is a substantially uniform magnetic field. This substantially uniform magnetic field is detected by the receiver as noise. Due to its substantially uniform nature, the noise may cause a substantially identical response from the first inductive coil and the second inductive coil. As a result, the first current may be identical to the second current as a result of exposure to substantially uniform magnetic noise. In other words, substantially identical currents may flow in the first inductive coil and the second inductive coil as a result of exposure to substantially uniform magnetic noise.

During a receiving operation, a first current may flow in the first inductive coil and a second current may flow in the second inductive coil in response to both a magnetic signal from a transmitter and magnetic noise, where the magnetic field of the transmitter is a non-uniform magnetic field and the magnetic noise is a substantially uniform magnetic field. Due to the identical nature of the first inductive coil and the second inductive coil, a portion of the first current that flows in response to the magnetic signal from the transmitter in the first inductive coil will be different to a portion of the second current that flows in response to the magnetic signal from the transmitter in the second inductive coil, but a portion of the first current that flows in response to the magnetic noise in the first inductive coil will be substantially identical to a portion of the second current that flows in response to the magnetic noise in the second inductive coil. In other words, the magnetic noise will induce a portion of the first current and a portion of the second current which are substantially identical, and the magnetic signal from a transmitter will induce a portion of the first current and a portion of the second current which are substantially not identical.

Hence, a subtraction of one of the first current and the second current from the other of the first current and the second current will result in a subtraction of a portion of one of the first current and the second current that flows in response to the magnetic noise from a portion of the other of the first current and the second current that flows in response to the magnetic noise. As these portions are identical, the portion of a resulting current that flows in response to the magnetic noise is substantially zero. Hence, the resulting current comprises reduced noise, compared to each of the first current and the second current. In other words, the substantially identical portions of the first current and the second current that are induced in response to magnetic noise may be cancelled by the subtraction. Simultaneously, the substantially not identical portions of the first current and the second current that are induced in response to the magnetic field of the transmitter may be preserved in the subtraction. The subtraction is effected by a connection arrangement between the first inductive coil, second inductive coil and the amplifier.

The downhole electromagnetic induction communication system receiver comprises an amplifier. The amplifier may be a low inherent noise amplifier. The amplifier may be an ultra-low inherent noise amplifier. The first inductive coil and the second inductive coil are electrically connected to inputs of the amplifier. The first inductive coil and the second inductive coil are configured to convert a magnetic signal into a first input electrical signal and a second input electrical signal. In this way, the amplifier receives a first input electrical signal from the first inductive coil and a second electrical input signal from the second inductive coil. The first input electrical signal and second electrical input signal are representative of the first current and the second current respectively. The first inductive coil and the second inductive coil are differentially connected to inputs of the amplifier. Accordingly, a differential connection arrangement exists between the first inductive coil, second inductive coil and the amplifier.

To achieve the differential connection arrangement a first end of the first inductive coil is connected to a first input terminal of the amplifier, a second end of the first inductive coil is connected to a ground terminal of the amplifier, a first end of the second inductive coil is connected to a ground terminal of the amplifier, and a second end of the second inductive coil is connected to a second input terminal of the amplifier. In other words, an end of the first inductive coil that is connected to a ground terminal of the amplifier is different to an end of the second inductive coil that is connected to a ground terminal of the amplifier. Also, an end of the first inductive coil that is connected to an input terminal of the amplifier is different to an end of the second inductive coil that is connected to an input terminal of the amplifier. In this way, the first inductive coil and the second inductive coil are differentially connected to the amplifier. That is to say, with respect to the first inductive coil, the second inductive coil is inversely connected to the amplifier. In other words, the second inductive coil is connected to the amplifier in an opposite direction compared to the first inductive coil. The second inductive coil is 'backwards' compared to the first inductive coil.

The first end of the first inductive coil and the first end of the second inductive coil may correspond to a matching pair of ends. When a first current is induced in the first inductive coil and a second current is induced in the second inductive coil, a first end of each of the first inductive coil and the second inductive coil may be a positive end. Alternatively, when a first current is induced in the first inductive coil and a second current is induced in the second inductive coil, a second end of each of the first inductive coil and the second inductive coil may be a positive end.

In a case where the first inductive coil and the second inductive coil are wound in a same direction, the first ends may both be right hand ends, or left hand ends, upper ends, or lower ends. In other words, the ends may be disposed in similar locations relative to a rest of a respective inductive coil. In a case where the first inductive coil and the second inductive coil are wound in opposite directions, the first ends may both be inner ends, or outer ends, central ends, or distal ends. In other words, the ends may be disposed in similar locations relative to a centre of a receiver.

According to a differential connection arrangement, the first input electrical signal and the second electrical input signal, as measured at the inputs to the amplifier, have opposite polarity. In other words, at any given moment, a voltage of the first input electrical signal may be oppositely polarised to a voltage of the second electrical input signal. The opposing polarities of the first input electrical signal and the second electrical input signal are achieved by the differential connection arrangement as the first end of the first inductive coil and the second end of the second inductive coil are connected to the input terminals of the amplifier. The first end of the first inductive coil and the second end of the second inductive coil are not a matching pair, so when a magnetic field induces a current to flow in the first inductive coil and the second inductive coil one, of the first end of the first inductive coil and the second end of the second inductive coil is connected to a positive end of its respective inductive coil, and the other of the first end of the first inductive coil and the second end of the second inductive coil is connected to a negative end of its respective inductive coil.

The first inductive coil and the second inductive coil are differentially connected to inputs of the amplifier, such that a differential input electrical signal is found. At the inputs of the amplifier, a summation is performed on the first input electrical signal and the second electrical input signal to produce a differential input electrical signal. The amplifier amplifies the differential input electrical signal to produce an amplified electrical signal. As the first input electrical signal and the second input electrical signal, as measured at the inputs to the amplifier, have opposite polarity, the summation of the first input electrical signal and the second electrical input signal finds a difference in absolute amplitude terms between the first input electrical signal and the second electrical input signal.

Hence, in the same way that a subtraction of one of the first current and the second current from the other of the first current and the second current results in a subtraction of a portion of one of the first current and the second current that flows in response to the magnetic noise from a portion of the other of the first current and the second current that flows in response to the magnetic noise, a summation of the first input electrical signal and the second electrical input signal results in a subtraction of a portion of one of the first input electrical signal and the second electrical input signal that exists in response to the magnetic noise from a portion of the other of the first input electrical signal and the second electrical input signal that exists in response to the magnetic noise. Simultaneously, portions of the first input electrical signal and the second electrical input signal that exist in response to the magnetic field of the transmitter may be preserved in the summation. Hence, noise in the first input electrical signal and the second electrical input signal is cancelled during the summation to produce the differential input electrical signal with reduced noise. The differential input electrical signal comprises reduced noise compared with the first input electrical signal and the second input electrical signal. In this way, the summation results in a differential input electrical signal with reduced noise and an improved signal-to-noise ratio compared to the first input electrical signal and the second electrical input signal.

The magnetic and electrical signals of the downhole electromagnetic induction communication system receiver may comprise measurement data.

The magnetic signal received by the receiver may comprise measurement data. The electrical signals into which the receiver converts the magnetic signal may comprise measurement data. The measurement data may comprise data from sensors that are connected to the transmitter. The sensors may be analogue or digital sensors.

Additionally or alternatively, the magnetic and electrical signals may comprise control commands. The magnetic signal received by the receiver may comprise control commands. The electrical signals into which the receiver converts the magnetic signal may comprise control commands. The control commands may be configured to control, for example, provide instructions to, equipment that is connected to the receiver.

The magnetic signal may be a modulated magnetic signal. The electrical signals may be modulated electrical signals. The magnetic and/or electrical signals may be modulated using any one selected from the range: frequency-shift keying, phase-shift keying, differential phase-shift keying, quadrature phase-shift keying.

The downhole electromagnetic induction communication system receiver may operate in a frequency band selected from the range: 3-30 Hz; 30-300 Hz; 300-3000 Hz.

The 3-30 Hz frequency, extremely low frequency, band is suitable for use by a transmitter arranged inside metal tubing. A magnetic signal from a transmitter may be less attenuated by eddy current induced in the metal tubing at the 3-30 Hz frequency band than at higher frequency bands. In this way, the use of the 3-30 Hz frequency band may enable a downhole electromagnetic induction communication system receiver to receive magnetic signals from a transmitter arranged inside metal tubing. This may facilitate clearer communication through metal walls than is achievable with other frequency bands.

The 30-300 Hz frequency, super low frequency, and 300-3000 Hz frequency, ultra-low frequency, bands are suitable for use by a transmitter that is not arranged inside metal tubing. Alternatively, the 30-300 Hz frequency, super low frequency, and 300-3000 Hz frequency, ultra-low frequency, bands are suitable for use by a transmitter that is arranged inside less metal tubing. For example, the transmitter may be arranged inside metal tubing with a reduced wall thickness, or a reduced number of layers of tubing. The 30-300 Hz frequency, super low frequency, and 300-3000 Hz frequency, ultra-low frequency, bands may be more power efficient than the 3-30 Hz frequency, extremely low frequency, band. It may be advantageous to use the 30-300 Hz frequency, super low frequency, and 300-3000 Hz frequency, ultra-low frequency, bands to reduce a power consumption of the transmitter. In addition, a level of noise resulting from vibration may be reduced at higher frequencies. In contrast, power dissipation due to core losses is proportional to frequency, hence core losses may be reduced by operation at a low frequency such as the 3-30 Hz frequency, extremely low frequency, band.

Frequencies higher than 3000 Hz may be avoided due to a strong attenuation of these frequencies by conductive underground rock.

The first inductive coil and the second inductive coil of the downhole electromagnetic induction communication system receiver may be air core inductive coils.

Air core inductive coils may be selected for the first inductive coil and the second inductive coil because it may be comparatively easier to match a pair of air core inductive coils than to match a pair of other conductive coils. Other conductive coils may be inductive coils with a core formed from a magnetic material. The magnetic material may be a material with high magnetic permeability, such as a ferrous material. Hence, air core inductive coils may be selected for the first inductive coil and the second inductive coil to improve an ease of matching the first inductive coil and the second inductive coil.

The first inductive coil and the second inductive coil may be closely matched to improve a cancellation of noise in the differential input electrical signal that is found from the first input electrical signal and a second input electrical signal. A closely matched pair of coils selected for the first inductive coil and the second inductive coil may exhibit a more closely matched response to a uniform magnetic field than a less closely matched pair of coils. In other words, a closely matched pair of coils selected for the first inductive coil and the second inductive coil may exhibit a more closely matched response to a magnetic noise than a less closely matched pair of coils. Hence, a closely matched pair of coils may enable a cancellation of more noise in the differential input electrical signal than a less closely matched pair of coils. This may reduce a noise and improve a signal-to-noise ratio of the differential input electrical signal. In this way, air core inductive coils may be selected for the first inductive coil and the second inductive coil to reduce a noise and improve a signal-to-noise ratio of the differential input electrical signal.

The first inductive coil and the second inductive coil of the downhole electromagnetic induction communication system receiver may be substantially identical inductive coils.

The first inductive coil and the second inductive coil of the downhole electromagnetic induction communication system receiver may each exhibit substantially identical behaviour in the presence of a uniform magnetic field. A current induced in each of the first inductive coil and the second inductive coil of the downhole electromagnetic induction communication system receiver in the presence of a uniform magnetic field may be substantially identical. A current induced in each of the first inductive coil and the second inductive coil of the downhole electromagnetic induction communication system receiver in the presence of a uniform magnetic field may be substantially identical within a margin of 1%.

To achieve substantially identical behaviour of the first inductive coil and the second inductive coil in the presence of a uniform magnetic field, the first inductive coil and the second inductive coil may have substantially identical dimensions, material properties and/or manufacturing configurations. The first inductive coil and the second inductive coil may be formed of a substantially identical magnet wire. The first inductive coil and the second inductive coil may be formed of a magnet wire having a substantially identical diameter. The first inductive coil and the second inductive coil may be formed of a substantially identical number of turns of magnet wire. Such a number of turns of magnet wire may be 1000 turns. The first inductive coil and the second inductive coil may be formed of magnet wire wound in a same direction. The magnet wire may be copper wire.

The first inductive coil and the second inductive coil may have a substantially identical diameter. The first inductive coil and the second inductive coil may have a substantially identical axial length. The first inductive coil and the second inductive coil may have a substantially identical mass.

Alternatively, the first inductive coil and the second inductive coil may not be substantially identical. For example, a first inductive coil may have a larger diameter than a second inductive coil. In this case, the first inductive coil and the second inductive coil may be carefully selected to exhibit substantially identical behaviour in the presence of a uniform magnetic field.

The first inductive coil and the second inductive coil may be balanced using any suitable balancing device. Such a balancing device may be a device configured to create a substantially uniform magnetic field over at least the distance between the first inductive coil and the second inductive coil as arranged in the receiver. The first inductive coil and the second inductive coil may be balanced using a Helmholz coil, or a pair of Helmholz coils. By balancing the first inductive coil and the second inductive coil using a pair of Helmholz coils, a current induced in each of the first inductive coil and the second inductive coil of the downhole electromagnetic induction communication system receiver in the presence of a uniform magnetic field may be substantially identical within a margin of 0.01%.

The first inductive coil and the second inductive coil of the downhole electromagnetic induction communication system receiver may be separated by a pre-determined distance, the pre-determined distance preferably being between 0.5 m and 1.5 m.

The pre-determined distance may be arranged along an axis of the first inductive coil and/or the second inductive coil. Additionally or alternatively, the pre-determined distance may be arranged along an axis of the receiver. Additionally or alternatively, the pre-determined distance may be arranged along an axis of a transmitter. In this way, the first inductive coil and the second inductive coil may each be separated from a transmitter by a different distance.

In the presence of a non-uniform magnetic field transmitted by a transmitter, a current induced in the one of the first inductive coil and the second inductive coil that is arranged closer to the transmitter may be greater than a current induced in the one of the first inductive coil and the second inductive coil that is arranged further from the transmitter. Subsequently, a resulting first input electrical signal and second input electrical signal at inputs of the amplifier may be unequal in amplitude. Finally a resulting differential input electrical signal may be non-zero and data received from the transmitter may be delivered to a host system by the receiver.

In the case where longitudinal axes of the first inductive coil, second inductive coil, receiver and transmitter are collinear, vibrations and shock caused by downhole drilling operations may impact the first inductive coil, second inductive coil, receiver and transmitter in a same direction relative to a longitudinal axis of each of the first inductive coil, second inductive coil, receiver and transmitter respectively. Hence portions of the first current induced in the first inductive coil and the second current induced in the second inductive coil by vibration and shock induced magnetic noise may have increased similarity. This may reduce noise in the differential input electric signal as a cancellation of noise may be further improved by the increased similarity between the first current and the second current, and subsequently the first input electrical signal and the second input electrical signal. In this way noise may be reduced and a signal-to-noise ratio may be improved by the collinear arrangement of the first inductive coil, second inductive coil, receiver and transmitter.

An electrically resistive element may be connected between the first inductive coil and the second inductive coil of the downhole electromagnetic induction communication system receiver, wherein the electrically resistive element is and arranged to damp a high frequency self-resonance noise in the first inductive coil and the second inductive coil. The amplifier of the downhole electromagnetic induction communication system receiver may be differential amplifier.

The amplifier of the downhole electromagnetic induction communication system receiver may have a gain of at least 10,000.

The amplifier of the downhole electromagnetic induction communication system receiver may comprise a first input terminal, a second input terminal and a ground terminal; wherein a first end of the first inductive coil is configured to be connected to the first input terminal and a second end of the first inductive coil is connected to the ground terminal; and wherein a first end of the second inductive coil is connected to the ground terminal and a second end of the second inductive coil is connected to the second input terminal.

A downhole electromagnetic induction communication system may comprise the downhole electromagnetic induction communication system receiver. The downhole electromagnetic induction communication system receiver may be comprised in a downhole electromagnetic induction communication system.

The downhole electromagnetic induction communication system may further comprise a transmitter.

A transmitter of the downhole electromagnetic induction communication system may comprise an antenna. The antenna may comprise a core around which an inductive coil is wound. The core may be an elongated core. The core may be formed of a material with high magnetic permeability. The inductive coil may be a solenoid coil. An electrical power may be supplied to the inductive coil to magnetise the core.

A strength of a magnetic signal transmitted by the transmitter is proportional to the total volume of a core that is magnetised during an operation of the transmitter. Hence, increasing a volume of a core may increase a strength of the magnetic signal transmitted by the transmitter. A volume of the core may be increased by increasing a length or diameter of the core.

Providing the antenna with an elongated core may improve an efficiency of the antenna. A power consumption of the antenna comprising an elongated core may be reduced compared to a power consumption of an antenna comprising a core having a same volume that is not elongated. The power consumption may correspond to a power required to magnetise a core. A length of the elongated core may be tuned to provide an improved performance of the antenna, and thereby the transmitter.

Additionally or alternatively, a transmitter may comprise a plurality of antenna. Each of the plurality of antenna may comprise a core around which an inductive coil is wound. A transmitter comprising a plurality of antennae may comprise a greater volume of a core that is magnetised during an operation of the transmitter than a transmitter comprising a single antenna. Hence, a strength of a magnetic field of a transmitter may be increased by increasing a number of antenna of the transmitter.

A transmitter of the downhole electromagnetic induction communication system may comprise a plurality of antenna, wherein at least one of the plurality of antennae is disposed in a protected groove on an outer diameter of the transmitter.

The protected groove may be a shallow recess in an outer surface of a chassis of a transmitter. The protected groove may comprise a metal cover.

Arranging an antenna in a protected groove on an outer diameter of the transmitter may reduce an attenuation of a magnetic signal output from the antenna. An attenuation of a magnetic signal output from the antenna may be caused by components of the transmitter being arranged in a path of the magnetic signal. Reducing a number or thickness of the components of the transmitter arranged in a path of the magnetic signal may reduce an attenuation of the magnetic signal. In this way, arranging an antenna on an outer diameter of the transmitter may reduce an attenuation of the magnetic signal. Simultaneously, arranging an antenna in a protected groove on an outer diameter of the transmitter may provide the antennae with mechanical protection.

Further, reducing an attenuation of the magnetic signal by arranging an antenna on another diameter of the transmitter may facilitate the use of a higher frequency band, for example the 30-300 Hz frequency, super low frequency, and 300-3000 Hz frequency, ultra-low frequency, bands. This may reduce a power consumption of the antenna as the power required to magnetise a core may be lower for the 30-300 Hz frequency, super low frequency, and 300-3000 Hz frequency, ultra-low frequency, bands, than for the 3-30 Hz frequency, extremely low frequency, band.

In this way, disposing an antenna in a protected groove on an outer diameter of the transmitter may reduce an attenuation of a magnetic signal, enabling a higher frequency band to be used, reducing a power consumption of the antenna, while providing adequate mechanical protection to the antenna.

The first inductive coil and the second inductive coil of the downhole electromagnetic induction communication system receiver may be arranged along a line extending an axis of the antenna of the transmitter. The first inductive coil and the second inductive coil of the downhole electromagnetic induction communication system receiver may be arranged along a line extending an axis of the transmitter.

A distance between the transmitter of the downhole electromagnetic induction communication system and the receiver of the downhole electromagnetic induction communication system may be between 2 m and 200 m.

A distance between the transmitter of the downhole electromagnetic induction communication system and the receiver of the downhole electromagnetic induction communication system may be between 2 m and 10 m.

It is understood that the downhole electromagnetic induction communication system receiver may comprise further inductive coils in addition to the first inductive coil and the second inductive coil.

The first inductive coil and the second inductive coil are rigidly connected to a chassis of the receiver. The chassis may provide structure to the receiver. The chassis is disposed centrally within the receiver, and is made from a non-magnetic material. The chassis is preferably made from a non-magnetic metallic material such as aluminium. The chassis is mounted on rubber isolators. The rubber isolators may reduce vibration forces at the first inductive coil and the second inductive coil by providing damping for high frequency oscillations.

The amplifier of the receiver is configured to output an amplified electrical signal. The receiver may comprise an analogue band pass filter configured to filter the amplified electrical signal to remove frequencies of the amplified electrical signal below a first pre-determined frequency, and/or above a second pre-determined frequency to provide a frequency band between the first pre-determined frequency and the second pre-determined frequency in which frequencies of the amplified electrical signal may pass unimpeded through the analogue band pass filter. The analogue band pass filter is configured to output a filtered electrical signal.

The analogue band pass filter is connected to an analogue to digital converter. The analogue to digital converter may have 24 bit resolution and a 2 kHz sampling frequency. The analogue to digital converter is configured to convert the filtered electrical signal into a digital electrical signal.

The analogue to digital converter is connected to a controller. The controller is configured to demodulate the digital electrical signal from the analogue to digital converter and produce a demodulated electrical signal. The controller is connected to a DC-DC converter. The DC-DC converter converts the demodulated electrical signal into a converted electrical signal. The DC-DC converter is connected to an interface module. The interface module is configured to communicate an output electrical signal from the receiver. The interface module may communicate the output electrical signal to a host system 136.

A downhole electromagnetic induction communication system may comprise a transmitter, wherein the transmitter comprises a rotating permanent magnet. A rotation of the permanent magnet may be modulated to allow communication data coding.

Advantageously, the downhole electromagnetic induction communication system receiver does not require contact to an external conductive ground. Such contact may reduce a mechanical strength of downhole tools.

Advantageously, the downhole electromagnetic induction communication system receiver does not depend on any metal tubing or blocking bore metal structures between a transmitter and the receiver. Further, the downhole electromagnetic induction communication system receiver does not require dedicated collars, or isolated external pads. The downhole electromagnetic induction communication system receiver does not require an insulated drill collar or current transformer.

Advantageously, magnetic signals of the downhole electromagnetic induction communication system may penetrate metal walls of downhole tubing if operated below 3000 Hz, within or below the ultra-low frequency band.

Advantageously, the downhole electromagnetic induction communication system receiver may continue to receive signals from a transmitter under harsh environmental conditions, such as high vibration and shock.

Advantageously, the downhole electromagnetic induction communication system receiver may be reliable and cost effective to produce and operate. A probe shape of the downhole electromagnetic induction communication system receiver mechanically simplifies the receiver.

Advantageously, the invention creates a highly balanced differential configuration capable of compensating for remote external magnetic noise and noise induced by vibration in the presence of a magnetic field of Earth.

The invention is suitable for use in many applications, including but not limited to measurements while drilling, MWD, logging while drilling, LWD, rotary steerable systems, RSS, resistivity geo-steering, near-bit directional measurement, drill stem testing, and production monitoring.

BRIEF DESCRIPTION OF THE DRAWINGS

Embodiments of the present invention will now be described by way of example only and with reference to the accompanying drawings, in which.

DETAILED DESCRIPTION

Figure 1:
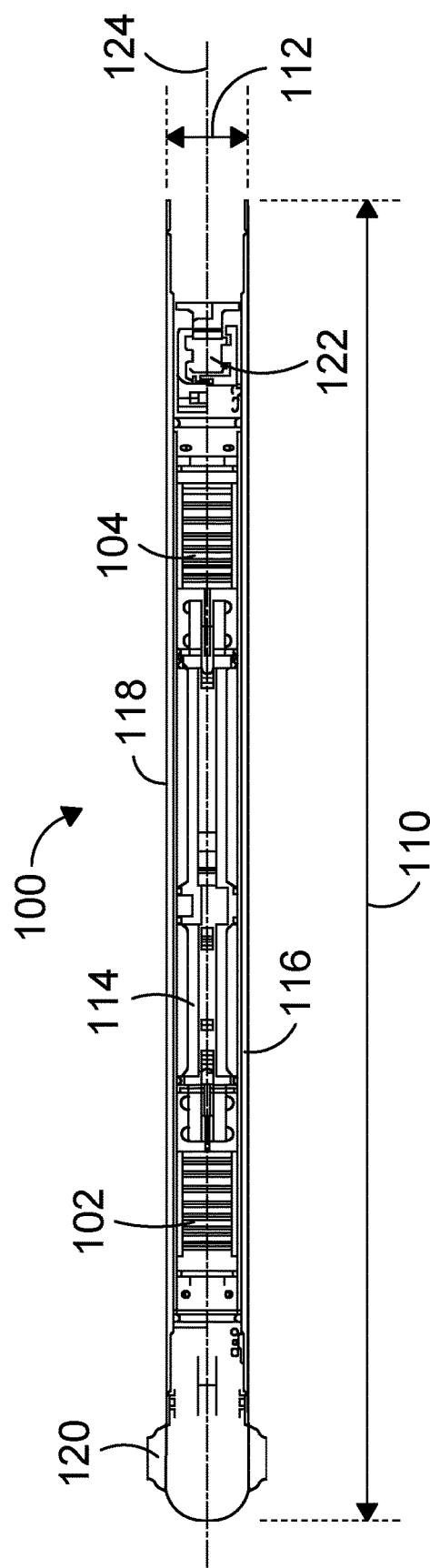
FIG. 1 depicts a schematic side view of the downhole electromagnetic induction communication system receiver according to the invention.
Figure 2:
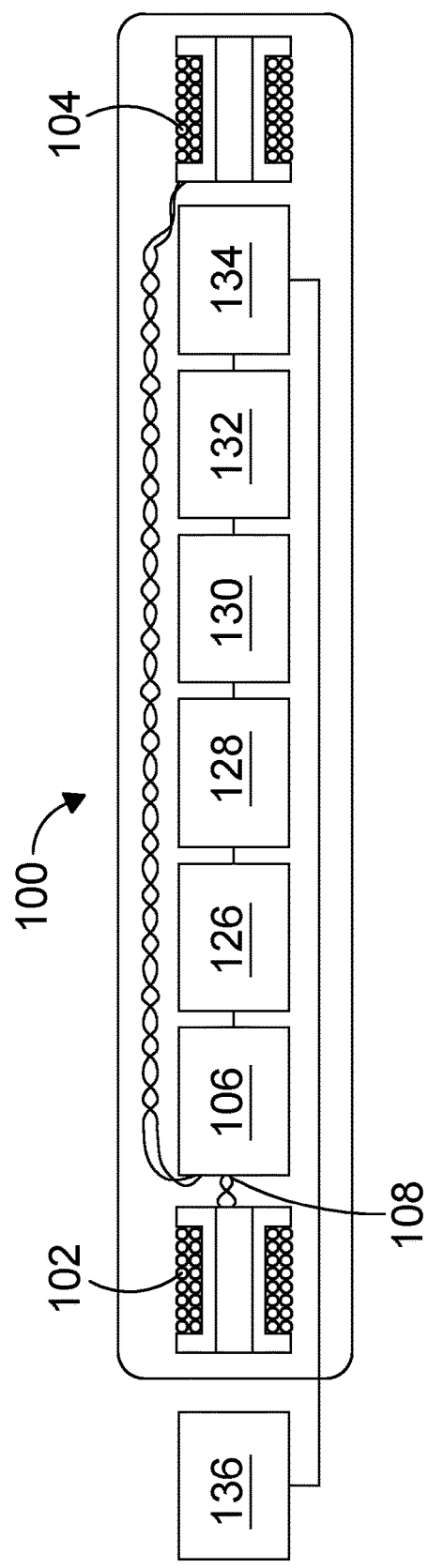
FIG. 2 depicts a diagram of components of the downhole electromagnetic induction communication system receiver of FIG. 1.

With reference to FIG. 1 and FIG. 2, a downhole electromagnetic induction communication system receiver 100 is arranged to receive from a transmitter a magnetic signal, the receiver 100 comprising: a first inductive coil 102, a second inductive coil 104, and an amplifier 106; wherein the first inductive coil 102 and the second inductive coil 104 are configured to convert the magnetic signal into a first input electrical signal and a second input electrical signal; and wherein the first inductive coil 102 and the second inductive coil 104 are differentially connected to inputs 108 of the amplifier 106, such that a differential input electrical signal is found, the differential input electrical signal comprising reduced noise compared with the first input electrical signal and the second input electrical signal.

With reference to FIG. 1, a receiver 100 is illustrated. The receiver 100 is probe shaped. In other words, the receiver 100 is essentially cylindrical and has a length 110 which is many times greater than a diameter 112 of the receiver 100. The receiver 100 comprises a central chassis 114 to provide structure to the receiver 100. The receiver 100 is encased inside a protective sleeve 116 which is disposed inside a pressure barrel 118. The receiver 100 is configured to be disposed, while in use, inside downhole tubing. The receiver 100 comprises fins 120 disposed on an outer surface of the pressure barrel 118. The fins 120 comprise a plurality of thin sheet-like protrusions that extend radially outwards from the outer surface of the pressure barrel 118. The receiver 100 is protected from vibration by a snubber 122. The snubber 122 may be any appropriate mechanical vibration damping device. The snubber 122 may absorb low frequency oscillations to improve a mechanical isolation of the chassis 114 of the receiver 100 from the downhole tubing.

The receiver comprises a first inductive coil 102 and a second inductive coil 104. The first inductive coil 102 and a second inductive coil 104 are mounted on the chassis 114 of the receiver 100, inside the protective sleeve 116 and pressure barrel 118. The first inductive coil 102 and second inductive coil 104 are separated from one another by a distance of approximately 0.5 m. The first inductive coil 102 and second inductive coil 104 are located substantially centrally within the receiver 100 such that a longitudinal axis 124 of the receiver 100 and longitudinal axes of each the first inductive coil 102 and second inductive coil 104 are collinear. The first inductive coil 102 and second inductive coil 104 are separated by a distance along the longitudinal axis 124 of the receiver 100.

The first inductive coil 102 and second inductive coil 104 are air core inductive coils. That is to say, the first inductive coil 102 and second inductive coil 104 do not comprise a core that is made from a material having a high magnetic permeability, for example a ferrous material. Instead, the cores of the first inductive coil 102 and second inductive coil 104 each comprise an air gap. In other words, the cores of the first inductive coil 102 and second inductive coil 104 may be empty. Air core inductive coils may be selected for the first inductive coil 102 and second inductive coil 104 to provide a close match of magnetic properties between the first inductive coil 102 and second inductive coil 104. Air core inductive coils may typically be manufactured to achieve a closer match of magnetic properties between individual inductive coils than high-permeability core inductive coils. Selecting air core inductive coils may enable a substantially identical pair of inductive coils to be selected for the first inductive coil 102 and second inductive coil 104.

Each of the first inductive coil 102 and second inductive coil 104 comprises magnet wire. Each of the first inductive coil 102 and second inductive coil 104 comprises the same magnet wire, that is, magnet wire with at least the same diameter, or gauge, material properties and coating. The first inductive coil 102 and second inductive coil 104 each comprise a plurality of turns of magnet wire. The first inductive coil 102 and second inductive coil 104 each comprise a substantially identical number of turns of magnet wire. The first inductive coil 102 and second inductive coil 104 are dimensionally identical. The first inductive coil 102 and second inductive coil 104 have a same nominal diameter and a same axial length. Within manufacturing tolerances, the first inductive coil 102 and second inductive coil 104 are substantially identical. Ensuring the first inductive coil 102 and second inductive coil 104 are substantially identical may further reduce a noise in the differential input electrical signal.

Due to the substantially identical nature of the first inductive coil 102 and the second inductive coil 104, a first input electrical signal and a second input electrical signal of substantially identical amplitudes are expected from the first inductive coil 102 and the second inductive coil 104 in the presence of a uniform magnetic field.

The chassis 114 provides mechanical support to the receiver 100, and in particular to the first inductive coil 102 and the second inductive coil 104. The chassis 114 is disposed centrally within the receiver 100, and is made from a non-magnetic material. The chassis 114 is preferably made from a non-magnetic metallic material such as aluminum.

The protective sleeve 116 is made from a material that is suitable for providing the receiver with mechanical protection. The protective sleeve 116 is made from a non-magnetic material, preferably a composite material, for example a high temperature glass reinforced plastic material. The pressure barrel 118 is made from a metallic material. The pressure barrel 118 is preferably made form a non-magnetic metallic material. The snubber 122 may improve a mechanical isolation of the first inductive coil 102 and the second inductive coil 104 from the downhole tubing. The snubber 122 may reduce vibration forces transmitted to the first inductive coil 102 and the second inductive coil 104. Rubber isolators (not shown) are used to further reduce vibration forces at the first inductive coil 102 and the second inductive coil 104 by providing damping for high frequency oscillations.

The receiver 100 comprises a signal processing unit, not shown, which houses the amplifier, to inputs of which the first inductive coil 102 and the second inductive coil 104 are differential connected. The signal processing unit comprises further electronics configured to process the signal, for example to filter, convert or distribute the signal. The further electronics are mounted on the chassis 114. Additionally or alternatively, the further electronics may be recessed into the chassis 114, for example disposed inside pockets of the chassis 114.

The fins 120 are configured to maintain an equal distance between the outer surface of the pressure barrel 118 and an inner surface of the downhole tubing in at least one plane. In other words the fins 120 centralise the receiver 100 within the downhole tubing. The fins 120 are configured to maintain the receiver 100 in a position that is substantially concentric or co-axial with the downhole tubing. The fins 120 are made of a polymer material, for example a rubber. Relative to the pressure barrel 118, the fins 120 are flexible. This flexibility allows the fins 120 to change shape to conform to the shape of the downhole tubing in order to effectively centralise the receiver 100. The fins 120 maybe made of a flexible material to provide compliance to the pressure barrel 118 of the receiver 100. The fins 120 comprise thin protrusions, where a height of each protrusion is several times greater than a thickness of each protrusion, such a shape may provide flexibility to the fins 120. The fins 120 may taper in thickness towards a point at an end distal from the receiver 100.

The right hand end of the pressure barrel 118 shown in FIG. 1 is shown open. In practice, the pressure barrel 118 is connected to a host system that is configured to receive data from the receiver 100. The pressure barrel 118 comprises a mechanical and/or electrical interface to enable connection to a host system.

With reference to FIG. 2, a block diagram of the receiver 100 of FIG. 1 is shown. The first inductive coil 102 and the second inductive coil 104 are connected to inputs 108 of the amplifier 106. The first inductive coil 102 and the second inductive coil 104 are differentially connected to inputs 108 of the amplifier 106, such that a differential input electrical signal is found, the differential input electrical signal comprising reduced noise compared with the first input electrical signal and the second input electrical signal.

The amplifier 106 is a low noise amplifier 106. The differential input electrical signal is amplified by the amplifier 106. An amplified electrical signal is output by the amplified 106. The amplifier 106 may have a gain of 10,000 or more. The amplifier 106 is connected to an analogue band pass filter 126. The analogue band pass filter 126 filters the amplified electrical signal to remove frequencies of the amplified electrical signal below a first pre-determined frequency, and/or above a second pre-determined frequency to provide a frequency band between the first pre-determined frequency and the second pre-determined frequency in which frequencies of the amplified electrical signal may pass unimpeded through the analogue band pass filter 126. The analogue band pass filter 126 is tuned to a pre-determined frequency band where the amplified electrical signal may be found. The analogue band pass filter 126 is configured to output a filtered electrical signal. The analogue band pass filter 126 is connected to an analogue to digital converter 128. The analogue to digital converter 128 may have 24 bit resolution and a 2 kHz sampling frequency. The analogue to digital converter 128 is configured to convert the filtered electrical signal into a digital electrical signal.

The analogue to digital converter 128 is connected to a controller 130. The controller 130 demodulates the digital electrical signal from the analogue to digital converter 128 with a pre-determined coding type. The pre-determined coding type is the same coding type used to encode the magnetic signals received by the receiver 100 from the transmitter. The controller 130 reverses the coding process to decode the digital electrical signal, working to undo the encoding performed at the transmitter before the magnetic signals were transmitted. The controller 130 demodulates the digital electrical signal from the analogue to digital converter 128 and produce a demodulated electrical signal.

The controller 130 is connected to a DC-DC converter 132. The DC-DC converter 132 converts the demodulated electrical signal into a converted electrical signal. The DC-DC converter 132 may adjust the voltage level of the demodulated electrical signal to produce the converted electrical signal. The DC-DC converter 132 may be a step-down converter.

As a result, the converted electrical signal may be at a lower voltage level than the demodulated electrical signal. Alternatively, the DC-DC converter 132 may be a step-up converter and the converted electrical signal may be at a higher voltage level than the demodulated electrical signal. Alternatively the DC-DC converter 132 may be programmable to output a range of voltage levels. In this case, the relationship between the converted electrical signal and the demodulated electrical signal may be variable.

The DC-DC converter 132 may provide power to other electrical components of the receiver 100. The DC-DC converter 132 may provide a stable output voltage.

The DC-DC converter 132 is connected to an interface module 134. The interface module is configured to communicate an output electrical signal from the receiver 100. The output signal may be the converted electrical signal from the DC-DC converter 132. The interface module 134 may communicate using a serial communication protocol such as automotive controller area network, CAN, or recommended standard 485, RS 485. The interface module 134 is configured to be in electrical communication with a host system 136. The interface module 134 may communicate the output electrical signal to a host system 136.

The host system 136 is not part of the receiver. The host system 136 may comprise control electronics. The control electronics may use the output electrical signal for the purposes of the host system 136 for example, as an input signal to a control system, or to report to a human operator.

In this way the receiver 100 receives a magnetic signal from a transmitter and delivers an electrical signal to the host system 136.

Figure 3:
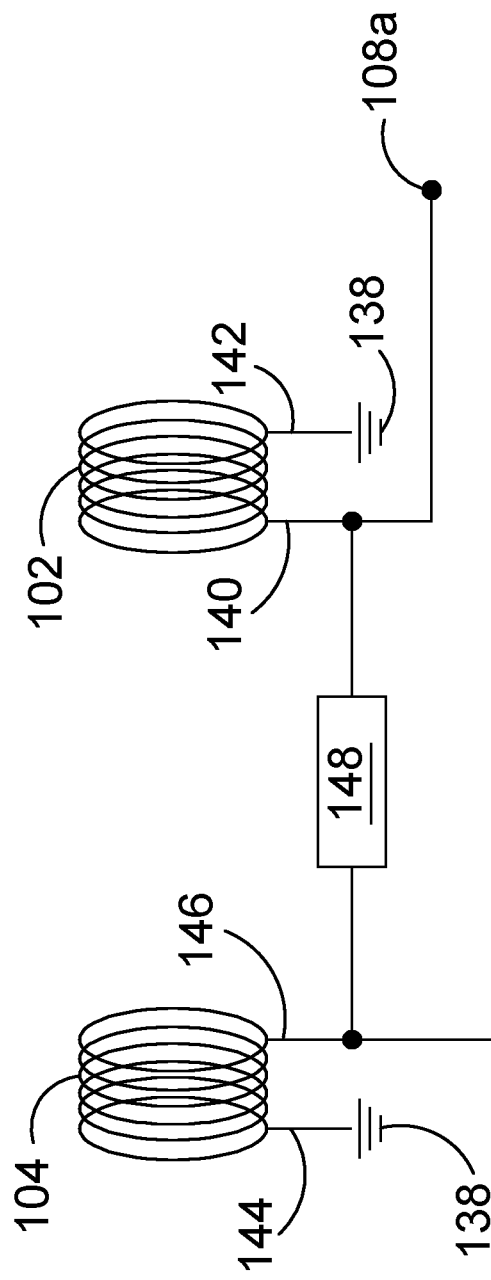
FIG. 3 depicts a schematic view of a circuit of the first inductive coil and the second inductive coil of the downhole electromagnetic induction communication system receiver of FIG. 1.

With reference to FIG. 3, a schematic diagram of the first inductive coil 102 and the second inductive coil 104 of the receiver 100 of FIG. 1 is shown. The first inductive coil 102 and the second inductive coil 104 are connected to inputs 108 of the amplifier 106. The first inductive coil 102 and the second inductive coil 104 are differentially connected to inputs 108 of the amplifier 106. The inputs 108 of the amplifier 106 comprise a first input terminal 108a, a second input terminal 108b and a ground terminal 138.

A first end 140 of the first inductive coil 102 is connected to a first input terminal 108a of the amplifier 106. A second end 142 of the first inductive coil 102 is connected to a ground terminal 138 of the amplifier 106. A first end 144 of the second inductive coil 104 is connected to a ground terminal 138 of the amplifier 106. A second end 146 of the second inductive coil 104 is connected to a second input terminal 108b of the amplifier 106. In this way, the first inductive coil 102 and the second inductive coil 104 are differentially connected to the amplifier 106. That is to say, with respect to the first inductive coil 102, the second inductive coil 104 is inversely connected to the amplifier 106. In other words, the second inductive coil 104 is connected to the amplifier 106 in an opposite direction compared to the first inductive coil 102. The second inductive coil 104 is 'backwards' compared to the first inductive coil 102.

As a result of the first inductive coil 102 and the second inductive coil 104 being differentially connected to inputs 108a, 108b of the amplifier 106, a polarity of a voltage at the first input terminal 108a from the first inductive coil 102 is opposite to a polarity of a voltage at second input terminal 108b from the second inductive coil 104. As the first inductive coil 102 and the second inductive coil 104 are substantially identical, a direction of a current flowing in the first inductive coil 102 and the second inductive coil 104 is identical, in a given magnetic environment. However, as the second inductive coil 104 is connected to the amplifier 106 in an opposite direction compared to the first inductive coil 102, a direction of a current flowing from the second inductive coil 104 at the second input terminal 108b of the amplifier 106 is in an opposite direction to a current flowing from the first inductive coil 102 at first input terminal 108a of the amplifier 106. Hence, a polarity of a voltage at second input terminal 108b from the second inductive coil 104 is opposite to a polarity of a voltage at the first input terminal 108a from the first inductive coil 102. The opposite polarity voltages at inputs 108a, 108b of the amplifier facilitate a cancellation of noise from the first input electrical signal and the second input electrical signal to produce a differential input electrical signal with reduced noise and improved signal-to-noise ratio.

An electrically resistive element 148 is connected between the first end 140 of the first inductive coil 102 and the second end 146 of the second inductive coil, such that the electrically resistive element 148 is connected between the first input terminal 108a and the second input terminal 108b of the amplifier 106. The electrically resistive element 148 is configured to damp high frequency self-resonance noise in the first inductive coil 102 and the second inductive coil 104. This may reduce the noise at the first input terminal 108a and the second input terminal 108b of the amplifier 106, thereby reducing the noise input to the amplifier 106, and subsequently reducing the noise in the amplified electrical signal.

Figure 4:
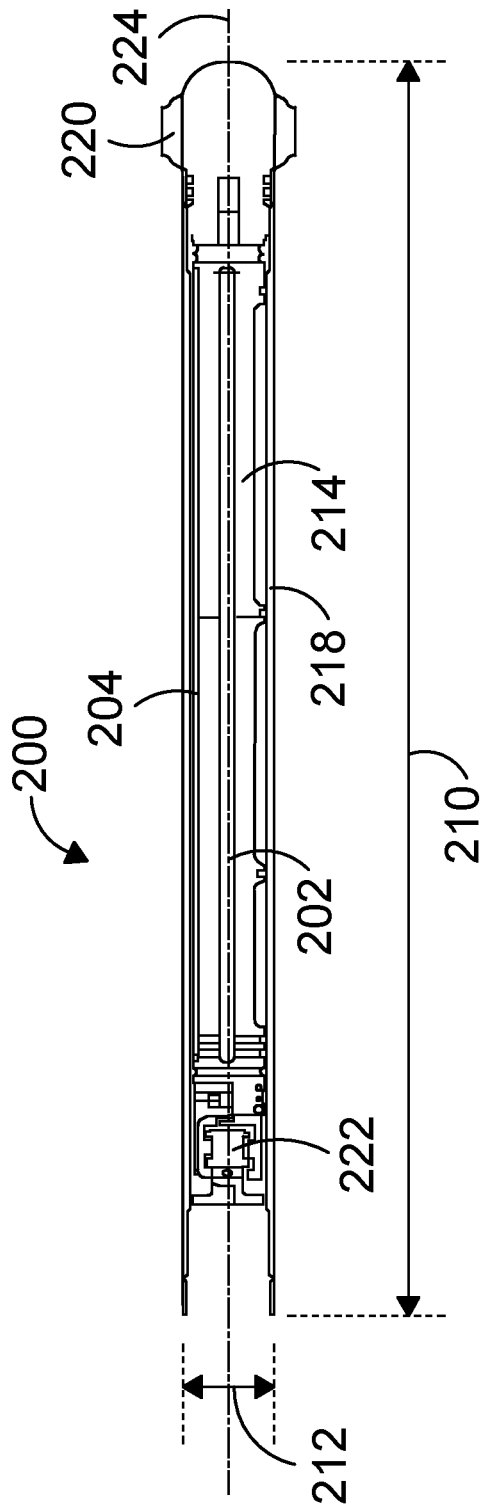
FIG. 4 depicts a schematic side view of the downhole electromagnetic induction communication system transmitter according to the invention.

With reference to FIG. 4, a downhole electromagnetic induction communication system transmitter 200 is illustrated. The transmitter 200 is configured to transmit magnetic signals to a receiver, such as the receiver 100 illustrated in FIG. 1. The transmitter 200 is probe shaped. In other words, the transmitter 200 is essentially cylindrical and has a length 210 which is many times greater than a diameter 212 of the transmitter 200. The transmitter 200 comprises a central chassis 214 to provide structure to the transmitter 200. The transmitter 200 is encased inside a pressure barrel 218. The transmitter 200 is configured to be disposed, while in use, inside downhole tubing. The transmitter 200 comprises fins 220 disposed on an outer surface of the pressure barrel 218. The fins 220 comprise a plurality of thin sheet-like protrusions that extend radially outwards from the outer surface of the pressure barrel 218. The transmitter 200 is protected from vibration by a snubber 222. The snubber 222 may be any appropriate mechanical vibration damping device. The snubber 222 may absorb low frequency oscillations to improve a mechanical isolation of the chassis 214 of the transmitter 200 from the downhole tubing.

The transmitter 200 is a magnetic transmitter comprising a first magnetic antenna 202 and a second magnetic antenna 204. The first magnetic antenna 202 and second magnetic antenna 204 are elongated such that a length of first magnetic antenna 202 and second magnetic antenna 204 is many times greater than any other dimension of the first magnetic antenna 202 and second magnetic antenna 204. The first magnetic antenna 202 and second magnetic antenna 204 each comprise a magnetic core. The magnetic cores are made from a material with high magnetic permeability, for example the magnetic cores of the first magnetic antenna 202 and second magnetic antenna 204 maybe made from laminated electrical steel.

The first magnetic antenna 202 and second magnetic antenna 204 each further comprise an inductive coil. The first magnetic antenna 202 and second magnetic antenna 204 may each comprise a solenoid. Each inductive coil is each arranged around its respective magnetic core, for example each inductive coil may be wound around its respective magnetic core. Each inductive coil may be wound around a majority of a length of the respective magnetic core. In some cases, each inductive coil may be wound around a full length of the respective magnetic core. The coils of each of the first magnetic antenna 202 and second magnetic antenna 204 are made from magnet wire. The coils each comprise a plurality of turns of magnet wire.

The first magnetic antenna 202 and the second magnetic antenna 204 are mounted on the chassis 214. The transmitter may also comprise transmitter circuitry configured to encode electrical signals as magnetic signals before transmission by the transmitter 200.

The transmitter circuitry may be mounted on the chassis 214. Additionally or alternatively, the transmitter circuitry may be recessed into the chassis 214, for example disposed inside pockets of the chassis 214.

The first magnetic antenna 202 and second magnetic antenna 204 are arranged parallel to the transmitter. In other words, a longitudinal axis 224 of the transmitter 200, a longitudinal axis of the first magnetic antenna 202, and a longitudinal axis of the second magnetic antenna 204 are parallel to one another. The first magnetic antenna 202 is located substantially centrally within the transmitter 200 such that the longitudinal axis 224 of the transmitter 200 and a longitudinal axis of the first magnetic antenna 202 are collinear.

The second magnetic antenna 204 is located at an outer surface of the chassis 214, such that the longitudinal axis 224 of the transmitter 200 and a longitudinal axis of the second magnetic antenna 204 are not collinear. The second magnetic antenna 204 may be arranged in a protected groove on an outer surface of the chassis 214 or the pressure barrel 218. Arranging the second magnetic antenna 204 on an outer surface of the chassis 214 or the pressure barrel 218 may reduce an attenuation of the magnetic signals caused by the chassis 214 or pressure barrel 218. This may reduce a power loss of the magnetic signals transmitted by the transmitter 200 which may improve the effectiveness of transmission by the transmitter 200 as the magnetic signals may be less attenuated and/or distinguishable from noise at a greater distance.

The first magnetic antenna 202 and the second magnetic antenna 204 may be part of an array of magnetic antennae comprising a further antenna or a further plurality of magnetic antennae. Such an array of antennae may be used to increase the magnetic moment created by the transmitter 200 by increasing the volume of magnetic cores present in the transmitter 200. An increase in the magnetic moment may cause an increase in the magnetic field strength of the transmitter 200 which may allow the transmitter 200 to transmit magnetic signals over a longer distance and/or with more power. This may improve the effectiveness of transmission by the transmitter 200 as the magnetic signals may be clearer or detectable from a greater distance.

The chassis 214 provides mechanical support to the transmitter 200, and in particular to the first magnetic antenna 202 and the second magnetic antenna 204. The chassis 214 is disposed centrally within the transmitter 200, and is made from a non-magnetic material. The chassis 214 is preferably made from a non-magnetic metallic material such as aluminium.

The pressure barrel 218 is made from a metallic material. The pressure barrel 218 is preferably made form a non-magnetic metallic material. The snubber 222 may improve a mechanical isolation of the first magnetic antenna 202 and the second magnetic antenna 204 from the downhole tubing. The snubber 222 may reduce vibration forces transmitted to the first magnetic antenna 202 and the second magnetic antenna 204. Rubber isolators (not shown) may be used to further reduce vibration forces at the first magnetic antenna 202 and the second magnetic antenna 204 by providing damping for high frequency oscillations.

The fins 220 are configured to maintain an equal distance between the outer surface of the pressure barrel 218 and an inner surface of the downhole tubing in at least one plane. In other words the fins 220 centralise the transmitter 200 within the downhole tubing. The fins 220 are configured to maintain the transmitter 200 in a position that is substantially concentric or co-axial with the downhole tubing. The fins 220 are made of a polymer material, for example a rubber. Relative to the pressure barrel 218, the fins 220 are flexible. This flexibility allows the fins 220 to change shape to conform to the shape of the downhole tubing in order to effectively centralise the transmitter 200. The fins 220 may be made of a flexible material to provide compliance to the pressure barrel 218 of the transmitter 200. The fins 220 may be thin protrusions, where a height of each protrusion is several times greater than a thickness of each protrusion, which may provide flexibility to the fins 220. The fins 220 may taper in thickness towards a point at an end distal from the transmitter 200.

The left hand end of the pressure barrel 218 shown in FIG. 4 is shown open. In practice, the pressure barrel 218 may be connected to a host system that is configured to provide data to the transmitter 200. The pressure barrel 218 may comprise a mechanical and/or electrical interface to enable connection to a host system.

Figure 5:
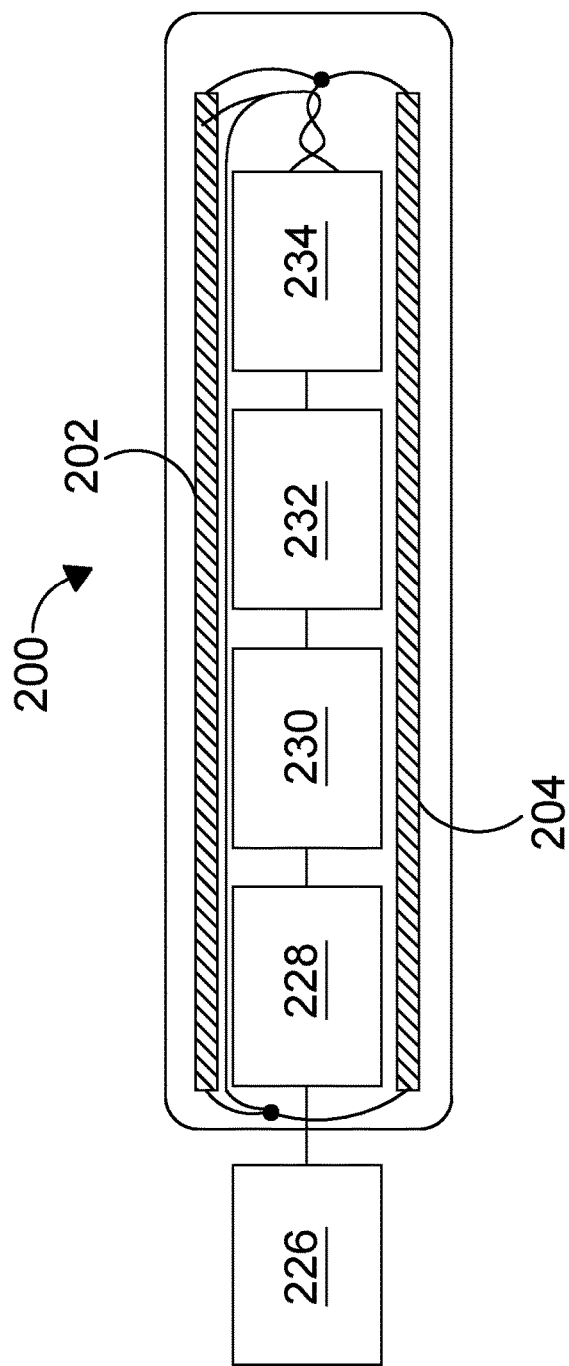
FIG. 5 depicts a diagram of components of the downhole electromagnetic induction communication system transmitter of FIG. 4.

With reference to FIG. 5, a block diagram of the transmitter 200 of FIG. 4 is shown. A host system 226 is connected to the transmitter 200. The host system 226 is not part of the transmitter 200. The host system 226 is configured to provide data, in the form of electrical signals, to the transmitter 200 for transmission. The host system 226 may be connected to, and in electrical communication with, an interface module 228.

The interface module 228 may communicate using a serial communication protocol such as automotive controller area network, CAN, or recommended standard 485, RS 485. The interface module may pass the electrical signals from the host system 226 to a DC-DC converter 230 as an input electrical signal.

The DC-DC converter 230 is configured to convert an input electrical signal from the interface module into a converted electrical signal. The DC-DC converter 230 may adjust the voltage level of the input electrical signal to produce the converted electrical signal. The DC-DC converter 230 may be a step-down converter. As a result, the converted electrical signal may be at a lower voltage level than the input electrical signal. Alternatively, the DC-DC converter 230 may be a step-up converter and the converted electrical signal may be at a higher voltage level than the input electrical signal. Alternatively the DC-DC converter 230 may be programmable to output a range of voltage levels. In this case, the relationship between the converted electrical signal and the input electrical signal may be variable.

The DC-DC converter 230 may provide power to other electrical components of the transmitter 200. The DC-DC converter 230 may provide a stable output voltage to a microcontroller 232 and a power driver 234.

The DC-DC converter 230 is connected to a microcontroller 232. The microcontroller 232 is configured to encode the converted electrical signal from the DC-DC converter 230 to produce an encoded electrical signal. The microcontroller 232 may use any suitable technique to encode the converted electrical signal to produce a modulated electrical signal. The microcontroller 232 may use frequency shift keying, FSK, phase shift keying, PSK, differential phase shift keying, DPSK, or quadrature phase shift keying, QPSK, pulse width modulation, PWM, or any other modulation technique to encode the converted electrical signal to produce the encoded electrical signal.

The microcontroller 232 is connected to the power driver 234. The power driver 234 receives the encoded electrical signal from the microcontroller 232 and is configured to amplify the encoded electrical signal to produce an amplified electrical signal.

The power driver is connected to the first magnetic antenna 202 and the second magnetic antenna 204. The first magnetic antenna 202 and the second magnetic antenna 204 are connected in parallel to power driver 206. The power driver 206 is configured to supply the amplified electrical signal to the inductive coils of the first magnetic antenna 202 and second magnetic antenna 204. The first magnetic antenna 202 and second magnetic antenna 204 transform the amplified electrical signal into a magnetic signal. The magnetic signal is transmitted by the transmitter 200, and received by receiver 100.

In this way the transmitter 200 receives an electrical signal from the host system 226 and transmits a magnetic signal for reception by the receiver 100.

Figure 6:
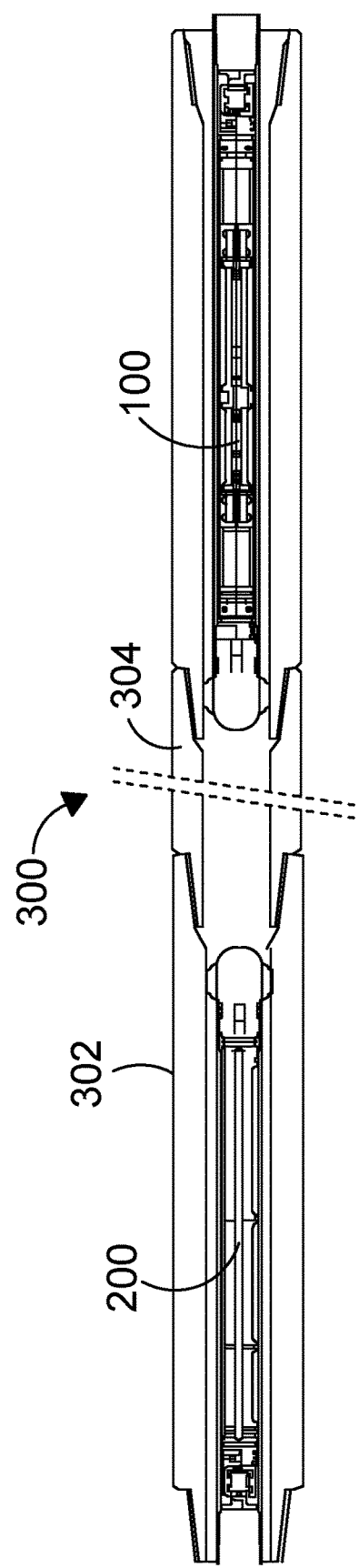
FIG. 6 depicts a schematic side view of the downhole electromagnetic induction communication system comprising the downhole electromagnetic induction communication system receiver of FIG. 1 and the downhole electromagnetic induction communication system transmitter of FIG. 4.

With reference to FIG. 6, a downhole electromagnetic induction communication system 300 is shown comprising a receiver 100 as illustrated in FIG. 1 and a transmitter 200 as illustrated in FIG. 4. The receiver 100 and transmitter 200 are both probe shaped, encased in pressure barrels 118 and 218 respectively, and configured to be disposed, while in use, inside downhole tubing 302.

The distance between the receiver 100 and the transmitter 200 may be between 2 m and 10 m. Alternatively, the distance between the transmitter 200 and the receiver 100 may be greater than 10 m. The system may be configured to operate over a longer distance by increasing a strength of the magnetic field and reducing a noise level in the downhole tubing 302.

Intermediate section 304 is located between the receiver 100 and the transmitter 200 and may comprise a straight length of downhole tubing 302. Additionally or alternatively, the intermediate section may comprise empty space, or any other equipment for use in downhole drilling such as a bottom mounted mud pulse long range telemetry pulser, packers, or valves which may be used in downhole drilling.

Figure 7:
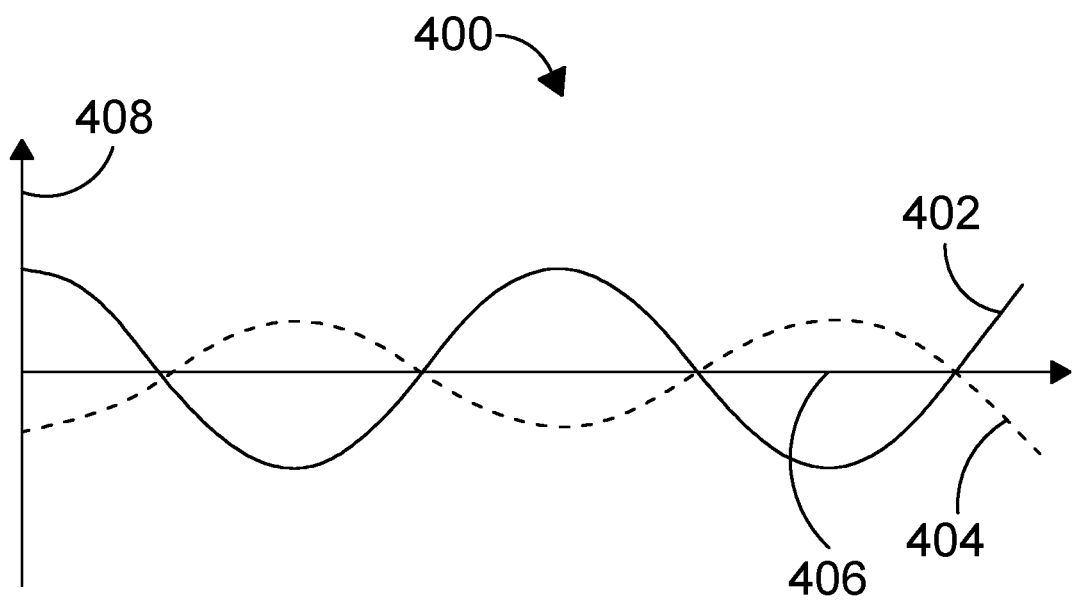
FIG. 7 depicts a graph of a first electrical signal and a second electrical signal as measured at inputs of the amplifier of the downhole electromagnetic induction communication system receiver of FIG. 1.

With reference to FIG. 7, a graph 400 of a first electrical signal 402 and a second electrical signal 404 is shown. An x axis 406 of the graph marks time and a y axis of the graph 408 marks amplitude. Hence the graph 400 shows an amplitude of each the first electrical signal 402 and the second electrical signal 404 over time.

The first electrical signal 402 and the second electrical signal 404 are measured at inputs 108 of the amplifier 106. The first electrical signal 402 is induced in the first inductive coil 102, and the second electrical signal 404 is induced in the second inductive coil 104, in the presence of a magnetic field.

At inputs 108 of the amplifier 106, the first electrical signal 402 and the second electrical signal 404 are summed to find a differential input electrical signal. In other words, a summation of the first electrical signal 402 and the second electrical signal 404 is performed and a result is a differential input electrical signal. The differential input electrical signal is representative of a signal transmitted by a transmitter.

For illustration purposes, there is no noise present in the first electrical signal 402 and the second electrical signal 404. To achieve such a noise free signal, the first electrical signal 402 and the second electrical signal 404 are induced in the first inductive coil 102 and the second inductive coil 104 respectively in an environment free from magnetic noise.

The first electrical signal 402 is an alternating current wave form with a first amplitude. The second electrical signal 404 is an alternating current wave form with a second amplitude. The first amplitude is greater than the second amplitude. In other words, an amplitude of the electrical signal, or current, output as the first electrical signal 402 from first inductive coil 102 is greater than an amplitude of the electrical signal, or current, output as the second electrical signal 404 from second inductive coil 104.

Excepting a difference in amplitude as discussed above, a shape of the first electrical signal 402 is identical to an inversion of a shape of the second electrical signal 404.

As discussed with reference to FIG. 3, an arrangement of connections between the first inductive coil 102, the second inductive coil 104 and inputs 108 of the amplifier 106 inverts an electrical signal, or current, from the second inductive coil 104 with respect to the electrical signal, or current, from the first inductive coil 102. As such, the second electrical signal 404, induced in the second inductive coil 104 and measured at inputs 108 of the amplifier 106, is inverted with respect to the first electrical signal 402, induced in the first inductive coil 102 and measured at inputs 108 of the amplifier 106.

Due to the identical nature of the first inductive coil 102 and the second inductive coil 104, as discussed with reference to FIG. 1, electrical signals of identical amplitude are expected from the first inductive coil 102 and the second inductive coil 104 in the presence of a uniform magnetic field. As the first amplitude is greater than the second amplitude, it follows that the first electrical signal 402 and the second electrical signal 404 are measured when the first inductive coil 102 and the second inductive coil 104 are in the presence of a non-uniform magnetic field. In other words, as the first amplitude and the second amplitude are not substantially identical, the magnetic field inducing the first electrical signal 402 in the first inductive coil 102 and the second electrical signal 404 in the second inductive coil 104 is non-uniform. In this case, a source of the non-uniform magnetic field is a transmitter. Any magnetic noise of the type generated by magnetic devices vibrating within Earth's magnetic field would present as a substantially uniform magnetic field.

The first amplitude, of the first electrical signal 402, being greater than the second amplitude, of the second electrical signal 404, indicates that the first inductive coil 102 is arranged closer to a magnetic source of the magnetic field, in this case a transmitter, than the second inductive coil 104.

Due to the amplitude of the first electrical signal 402, the first amplitude, being greater than amplitude of the second electrical signal 404, the second amplitude, when the first electrical signal 402 and the second electrical signal 404 are summed at inputs 108 of the amplifier 106, the resulting differential input electrical signal is non-zero. The non-zero differential input electrical signal comprises data transmitted by a transmitter, and this message will subsequently be delivered to the host system 136.

In this way, the first electrical signal 402 induced in the first inductive coil 102 by a magnetic field of a transmitter, and the second electrical signal 404 induced in the second inductive coil 104 by a magnetic field of a transmitter are summed at inputs 108 to the amplifier 106 to produce a differential input electrical signal which is non-zero, and proceeds through electronics of the receiver 100, as described with reference to FIG. 2, to the host system 136.

Figure 8:
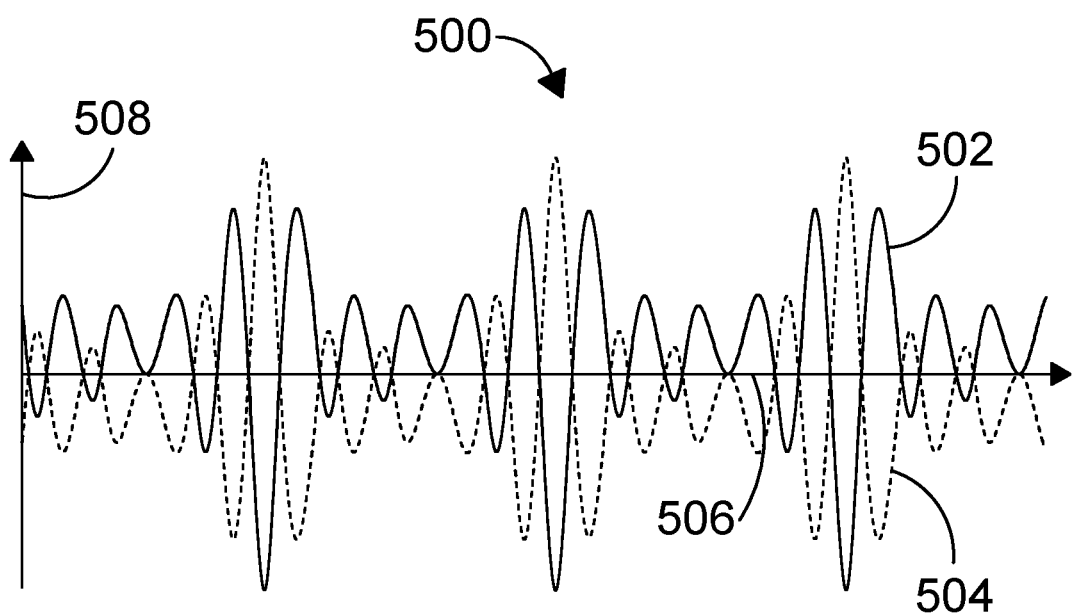
FIG. 8 depicts a second graph of a first electrical signal and a second electrical signal as measured at inputs of the amplifier of the downhole electromagnetic induction communication system receiver of FIG. 1.

With reference to FIG. 8, a graph 500 of a first electrical signal 502 and a second electrical signal 504 is shown. An x axis 506 of the graph marks time and a y axis of the graph 508 marks amplitude. Hence the graph 500 shows an amplitude of each the first electrical signal 502 and the second electrical signal 504 over time.

The first electrical signal 502 and the second electrical signal 504 are measured at inputs 108 of the amplifier 106. The first electrical signal 502 is induced in the first inductive coil 102, and the second electrical signal 504 is induced in the second inductive coil 104, in the presence of a magnetic field.

At inputs 108 of the amplifier 106, the first electrical signal 502 and the second electrical signal 504 are summed to find a differential input electrical signal. In other words, a summation of the first electrical signal 502 and the second electrical signal 504 is performed and a result is a differential input electrical signal. The differential input electrical signal is representative of a signal transmitted by a transmitter.

For illustration purposes, there is no signal transmitted by a transmitter in the first electrical signal 502 and the second electrical signal 504. The first electrical signal 502 and the second electrical signal 504 comprise noise only. To achieve such a noisy signal, the first electrical signal 502 and the second electrical signal 504 are induced in the first inductive coil 102 and the second inductive coil 104 respectively in an environment with magnetic noise.

An amplitude and shape of the first electrical signal 502 is identical to an inversion of an amplitude and shape of the second electrical signal 504. As discussed with reference to FIG. 3, an arrangement of connections between the first inductive coil 102, the second inductive coil 104 and inputs 108 of the amplifier 106 inverts an electrical signal, or current, from the second inductive coil 104 with respect to the electrical signal, or current, from the first inductive coil 102. As such, the second electrical signal 504, induced in the second inductive coil 104 and measured at inputs 108 of the amplifier 106, is inverted with respect to the first electrical signal 402, induced in the first inductive coil 102 and measured at inputs 108 of the amplifier 106.

Due to the identical nature of the first inductive coil 102 and the second inductive coil 104, as discussed with reference to FIG. 1, electrical signals of identical amplitude are expected from the first inductive coil 102 and the second inductive coil 104 in the presence of a uniform magnetic field. As, the amplitude and shape of the first electrical signal 502 and the amplitude and shape of the second electrical signal 504 are identical, save the inversion discussed above, it follows that the first electrical signal 502 and the second electrical signal 504 are measured when the first inductive coil 102 and the second inductive coil 104 are in the presence of a substantially uniform magnetic field. In this case, a source of the substantially uniform magnetic field is not a transmitter. The substantially uniform magnetic field may be, for example, generated by magnetic devices vibrating within Earth's magnetic field, producing magnetic noise.

Due to the amplitude and shape of the first electrical signal 502 being substantially identical to the amplitude and shape of the second electrical signal 504, when the first electrical signal 502 and the second electrical signal 504 are summed at inputs 108 of the amplifier 106, the resulting differential input electrical signal is, or is very close to, zero. Essentially, there is no differential input electrical signal resulting from the summation of the first electrical signal 502 and the second electrical signal 504 because the first electrical signal 502 and the second electrical signal 504 comprised only noise, induced by a substantially uniform magnetic field to give substantially identical electrical signals in the first inductive coil 102 and the second inductive coil 104. The substantially identical electrical signals cancelled one another when summed at inputs 108 of the amplifier 106.

In this way, the first electrical signal 402 induced in the first inductive coil 102 by a magnetic noise, and the second electrical signal 404 induced in the second inductive coil 104 by a magnetic noise are summed at inputs 108 to the amplifier 106 to produce a differential input electrical signal which is, or is close to, zero, and no differential input electrical signal proceeds through electronics of the receiver 100, as described with reference to FIG. 2, to the host system 136.

In practice, a first electrical signal induced in the first inductive coil and a second electrical signal induced in the second inductive coil would comprise both a signal from a transmitter, and magnetic noise. In this case, the signal from the transmitter would be preserved in a differential input electrical signal, as discussed with reference to FIG. 7, and the noise would be cancelled from the differential input electrical signal, as discussed with reference to FIG. 8.

In this way, the first electrical signal 402 induced in the first inductive coil 102 by a magnetic field of a transmitter and magnetic noise, and the second electrical signal 404 induced in the second inductive coil 104 by a magnetic field of a transmitter and magnetic noise are summed at inputs 108 to the amplifier 106 to produce a differential input electrical signal which comprises a high signal-to-noise ratio, i.e. a signal from which a noise component is substantially cancelled, and proceeds through electronics of the receiver 100, as described with reference to FIG. 2, to the host system 136.

The invention claimed is:
1. A downhole electromagnetic induction telemetry system comprising a transmitter and a differential receiver;
   the transmitter arranged to wirelessly transmit a telemetry signal to the differential receiver, the transmitter comprising:
      a microcontroller configured to modulate the telemetry signal to produce an encoded electrical signal; and a first magnetic antenna and a second magnetic antenna, each configured to convert the encoded electrical signal to a modulated magnetic signal and transmit the modulated magnetic signal;
wherein the first magnetic antenna and the second magnetic antenna each comprise an inductive coil wound around an elongate ferrous core, and wherein longitudinal axes of the first and second magnetic antenna are arranged parallel; and the differential receiver arranged to receive from the transmitter the telemetry signal, the differential receiver comprising:

a first inductive coil and a second inductive coil configured to convert the modulated magnetic signal into a first input electrical signal and a second input electrical signal; and an amplifier configured to output an amplified electrical signal;
wherein the first inductive coil and the second inductive coil are differentially connected to first and second inputs respectively of the amplifier, such that a polarity of a voltage at the first input from the first inductive coil is opposite to a polarity of a voltage at the second input from the second inductive coil and such that a differential input electrical signal is found, the differential input electrical signal comprising reduced noise compared with the first input electrical signal and the second input electrical signal;
the differential receiver further comprising a controller configured to decode the amplified electrical signal to receive the telemetry signal;
wherein the system operates in a 3-300 Hz frequency band.

2. A downhole electromagnetic induction telemetry system according to claim 1, wherein the magnetic and electrical signals comprise measurement data.

3. A downhole electromagnetic induction telemetry system according to claim 1, wherein at least one of the plurality of antennae is disposed in a protected groove on an outer diameter of the transmitter.

4. A downhole electromagnetic induction telemetry system according to claim 1, wherein the first inductive coil and the second inductive coil are air core inductive coils.

5. A downhole electromagnetic induction telemetry system according to claim 1, wherein the first inductive coil and the second inductive coil are substantially identical inductive coils.

6. A downhole electromagnetic induction telemetry system according to claim 1, wherein the first inductive coil and the second inductive coil are separated by a pre-determined distance, the pre-determined distance preferably being between 0.5 m and 1.5 m.

7. A downhole electromagnetic induction telemetry system according to claim 1, wherein an electrically resistive element is connected between the first inductive coil and the second inductive coil and arranged to damp a high frequency self-resonance noise in the inductive coils.

8. A downhole electromagnetic induction telemetry system according to claim 1, wherein the amplifier is differential amplifier.

9. A downhole electromagnetic induction telemetry system according to claim 1, wherein the amplifier has a gain of at least 10,000.

10. A downhole electromagnetic induction telemetry system according to claim 1, wherein the amplifier comprises:
a first input terminal, a second input terminal and a ground terminal, wherein a first end of the first inductive coil is configured to be connected to the first input terminal and a second end of the first inductive coil is connected to the ground terminal; and
wherein a first end of the second inductive coil is connected to the ground terminal and a second end of the second inductive coil is connected to the second input terminal.

11. A downhole electromagnetic induction telemetry system according to claim 1, wherein the inductive coils of the receiver are arranged along a line extending an axis of the antenna of the transmitter.

12. A downhole electromagnetic induction telemetry system according to claim 1, wherein a distance between the transmitter and the receiver is between 2 m and 200 m.

13. A downhole electromagnetic induction telemetry system according to claim 1, wherein a distance between the transmitter and the receiver is between 2 m and 10 ml.

* * * * *